United States Patent [19]
Muramoto et al.

[11] Patent Number: 4,549,819
[45] Date of Patent: Oct. 29, 1985

[54] ELECTRONIC CLINICAL THERMOMETER

[75] Inventors: Yutaka Muramoto; Taketoshi Ikegami, both of Fujinomiya, Japan

[73] Assignee: Terumo Kabushiki Kaisha, Tokyo, Japan

[21] Appl. No.: 742,655

[22] Filed: Jun. 10, 1985

Related U.S. Application Data

[63] Continuation of Ser. No. 465,343, Feb. 9, 1983, abandoned.

[30] Foreign Application Priority Data

Feb. 19, 1982 [JP] Japan ................................ 57-25770

[51] Int. Cl.$^4$ .............................................. G01K 7/00
[52] U.S. Cl. .................................... 374/178; 374/163; 350/331 T
[58] Field of Search ............................ 340/756, 870.02; 374/167, 169, 170, 171, 178, 179, 188, 183; 350/331 R, 331 T, 345; 128/736; 362/20, 802, 812; 40/465, 451, 546; 250/205, 214 AL, 231 R, 215, 227

[56] References Cited

U.S. PATENT DOCUMENTS

| | | | |
|---|---|---|---|
| 3,494,196 | 2/1970 | Moussette | 374/183 |
| 3,942,123 | 3/1976 | Georgi | |
| 4,009,535 | 3/1977 | Stock | 40/546 |
| 4,114,447 | 9/1978 | Creach | 374/170 |
| 4,174,631 | 11/1979 | Hammerslag | 374/179 |
| 4,198,676 | 4/1980 | Varnum et al. | 374/170 |
| 4,204,429 | 3/1980 | Shimazaki et al. | 374/170 |
| 4,284,884 | 8/1981 | Dyment et al. | 250/205 |

FOREIGN PATENT DOCUMENTS

| | | |
|---|---|---|
| 2649048 | 4/1978 | Fed. Rep. of Germany . |
| 2743233 | 4/1979 | Fed. Rep. of Germany . |
| 2404210 | 9/1978 | France . |
| 1442249 | 9/1974 | United Kingdom . |
| 2005096 | 4/1979 | United Kingdom . |

OTHER PUBLICATIONS

Patents Abstracts of Japan, vol. 3 No. 113 (E-139), Sep. 19, 1979, p. 132 E 139; and JP-A-54 91 276 (Daini Seikosha K.K.) (19-07-1979).
Patents Abstracts of Japan, vol. P2, No. 120 (E-62), Oct. 6, 1978, p. 6996 E 78; and JP-A-53 86 258 (Citizen Tokei K.K.) (29-07-1978).

Primary Examiner—Charles Frankfort
Assistant Examiner—David R. Schuster
Attorney, Agent, or Firm—Frishauf, Holtz, Goodman & Woodward

[57] ABSTRACT

An electronic clinical thermometer includes a liquid crystal display element for displaying the result of a temperature measurement, and a lamp circuit for illuminating the liquid crystal display element automatically at the end of the temperature measurement only when a sensed amount of ambient light is insufficient to permit easy reading of the temperature displayed by the liquid crystal element. The lamp circuit is switched on and off electronically, eliminating the need for mechanical contacts and manually operated push-buttons, thus making it possible to obtain a liquid-tight structure.

6 Claims, 8 Drawing Figures

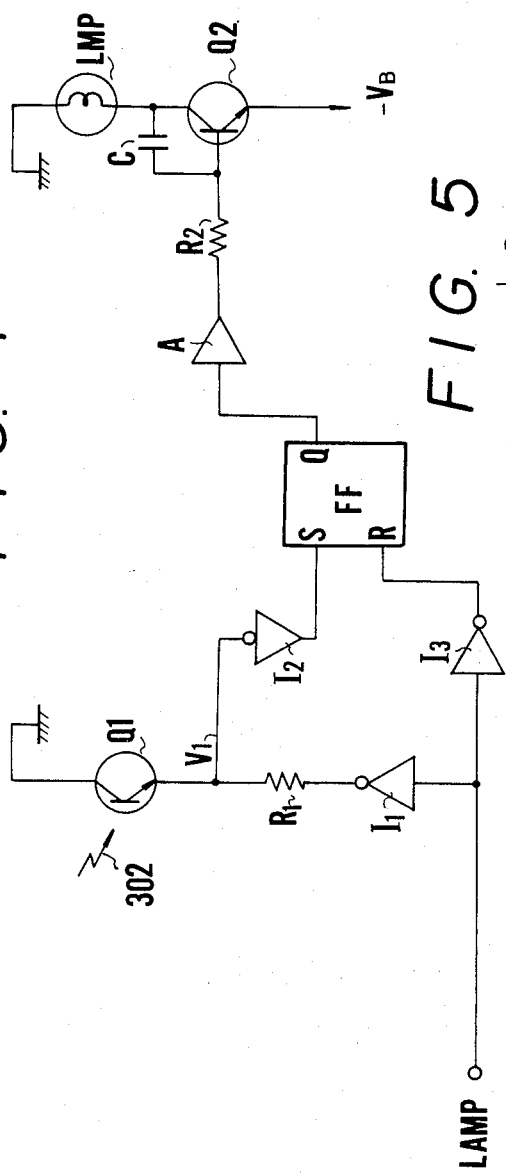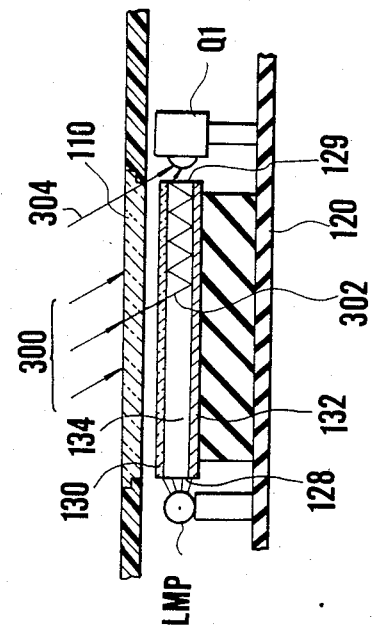
FIG. 4
FIG. 5

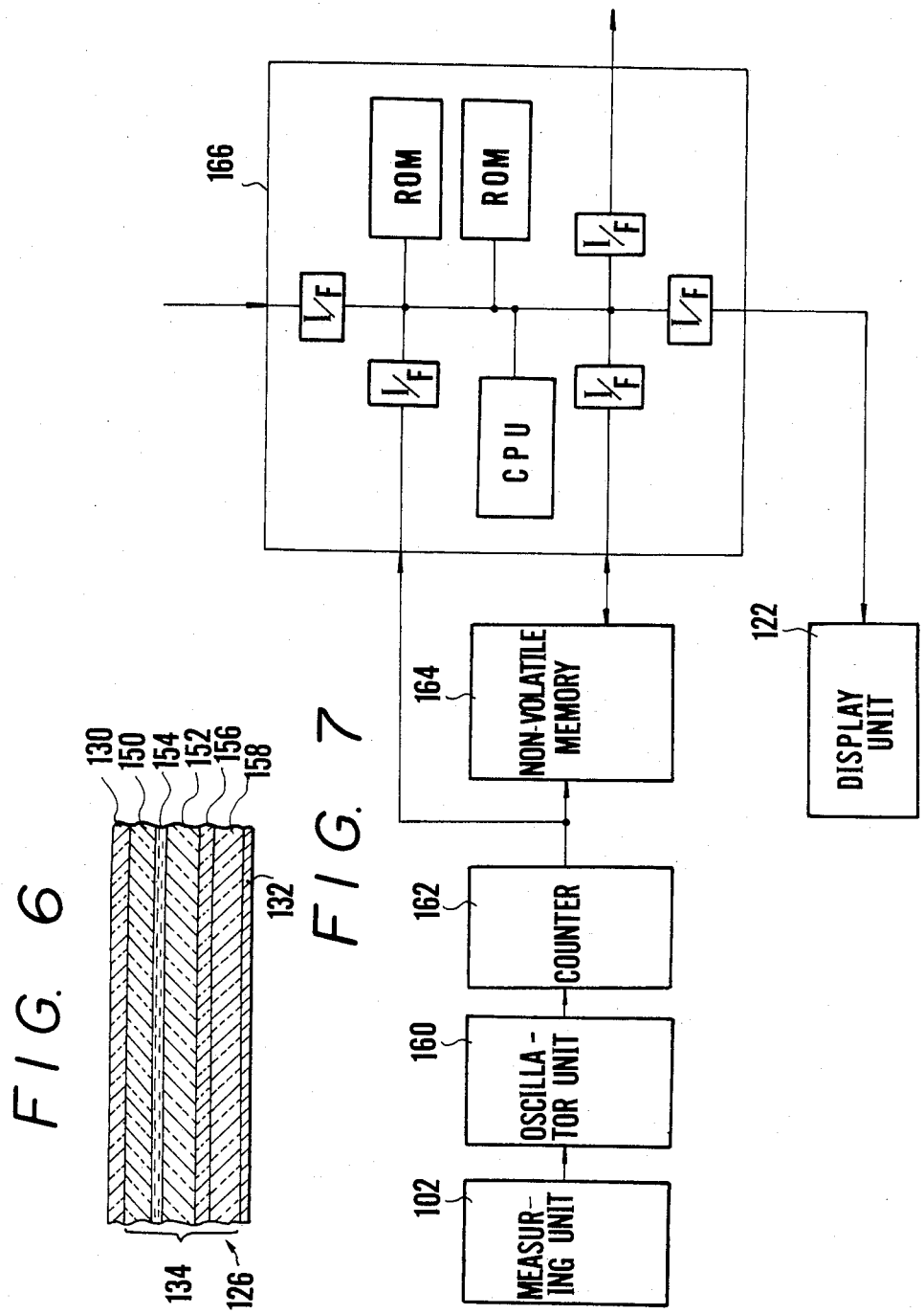

ELECTRONIC CLINICAL THERMOMETER

This application is a continuation of application Ser. No. 465,343, filed Feb. 9, 1983 and now abandoned.

BACKGROUND OF THE INVENTION

1. Field of the Invention

This invention relates to an electronic clinical thermometer and, more particularly, to an electronic clinical thermometer which includes an arithmetic unit for measuring the temperature of a part of the human body and for producing a signal indicative of the measured value, display means for presenting a visible display of the measured value, and an envelope for accommodating the arithmetic measurement unit and the display means. The thermometer is so adapted that the displayed value can be easily read even in a dark location.

2. Description of the Prior Art

The display unit in an electronic clinical thermometer of the above-described type most generally employs a highly reliable liquid crystal display element which consumes very little electric power. The progress that has been made in electronic techniques, moreover, has facilitated the development of such electronic clinical thermometers of small size. Because the liquid crystal display element presents a visual image by utilizing a difference in the reflectance of light, visual recognition of the displayed information is not possible unless there is a certain degree of external light available. This requires the provision of illuminating means so that the display can be read in the dark. In consideration of the fact that electronic clinical thermometers are frequently used in the dim light of morning and evening in, e.g., hospitals, it has been proposed that a light-emitting diode be employed as the display element. A light-emitting diode, however, consumes far more electric power than a liquid crystal display element and is unsuitable for use in small-sized electronic clinical thermometers which, relying upon a battery as the power source, do not provide enough space for the installation of a battery of large capacity.

For the arrangement having the liquid crystal display and illuminating means such as a lamp, it has been proposed that the electronic clinical thermometer be provided with a manual switch actuated by the operator to illuminate the display unit when necessary. Providing the switch, however, necessitates the use of many mechanically movable parts such as a manually operated push-button and mechanical contacts. Numerous problems arise in attempting to employ such a switch in a small size electronic clinical thermometer wherein a probe and display unit are integrated into a single package. Primarily, since a push-button forms a projection which protrudes from the thermometer envelope, the button is likely to be pressed accidentally by being inadvertently contacted by the operator's body when the thermometer is used. Also, when the thermometer is to be made small in size, it is required that the mechanical contacts used in the switch be comparatively small. Owing to wear with long use as well as insufficient mechanical strength, such contacts tend to lose their ability to make good contact and, hence, diminish the reliability of the electronic clinical thermometer as a whole. Furthermore, the fact that mechanically movable parts are provided which are operative from outside the thermometer makes it difficult to maintain the liquid tightness of the thermometer. This can limit the lifetime of the thermometer severely when one considers that a clinical thermometer must often be washed and sterilized with water or disinfectants.

SUMMARY OF THE INVENTION

Accordingly, an object of the present invention is to provide an electronic clinical thermometer devoid of the above-mentioned shortcomings encountered in the prior art.

A more detailed object of the present invention is to provide a highly reliable electronic clinical thermometer which can be used under any lighting circumstances owing to the provision of illuminating means which permits the temperature display to be read easily even in a dark area with minimal consumption of electric power for illumination.

These and other objects of the present invention are attained by providing an electronic clinical thermometer which includes, within the envelope defining the body of the thermometer, illuminating means for illuminating display means, photosensing means for sensing light incident thereon, and a control circuit connected to an arithmetic unit for temperature measurement and to the illuminating means and photosensing means. Upon the completion of a measurement performed by the arithmetic unit, the control circuit places the photosensing means in an operative state for a predetermined period of time and, when the photosensing means fails to sense ambient light above a prescribed level, activates the illuminating means for a predetermined period of time to illuminate the display means.

In an embodiment of the invention, the control circuit includes a transistor for driving the illuminating means. The collector-emitter circuit of the transistor is connected in series with the illuminating means, and a time-constant circuit is connected to the transistor base so that the base current rises in accordance with a prescribed time constant.

In another embodiment of the invention, the display means includes a liquid crystal display element, the illuminating means includes a light-emitting element disposed near one edge of the liquid crystal display element, and the photosensing means includes a light-receiving element disposed near the edge of the liquid crystal display element that is opposite the light-emitting element. Ambient light incident upon the liquid crystal display element propagates through the display element and is sensed by the light-receiving element.

Owing to the absence of an externally operated member such as a push-button, the thermometer envelope may be sealed to render it liquid-tight.

Other features and advantages of the invention will be apparent from the following description taken in conjunction with the accompanying drawings in which like reference characters designate the same or similar parts throughout the figures thereof.

BRIEF DESCRIPTION OF THE DRAWINGS

FIG. 4 is a circuit diagram illustrating a lamp drive circuit in the display unit of FIG. 2;

FIG. 5 is a side view, similar to that of FIG. 2, useful in describing the operation of the electronic clinical thermometer according to the present invention;

FIG. 6 is an enlarged sectional view of a display element shown in FIG. 2;

FIG. 7 is a block diagram illustrating an arithmetic unit for measuring temperature.

DESCRIPTION OF THE PREFERRED EMBODIMENTS

Figure 1:
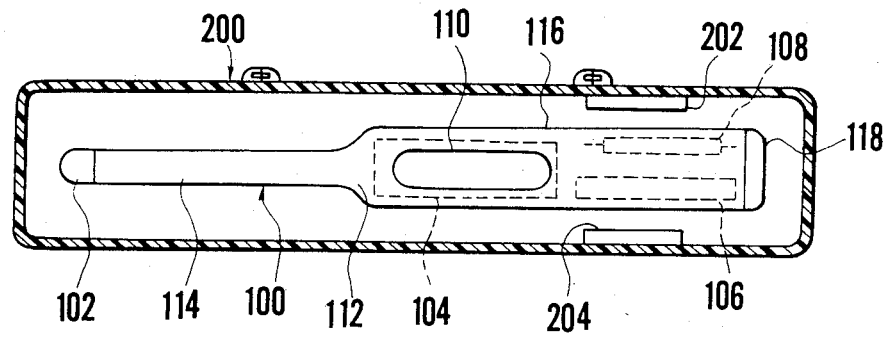
FIG. 1 is a plan view illustrating an embodiment of an electronic clinical thermometer according to the present invention.

FIG. 1 is a plan view illustrating an electronic clinical thermometer 100 embodying the present invention, wherein the thermometer, is small in size and has outer dimensions slightly larger than those of a so-called flat-type mercury clinical thermometer. The electronic clinical thermometer 100 is received in a protective case 200 made of plastic or the like when not in use. The thermometer includes a temperature measuring unit 102 which, when the thermometer is removed from the case 200 for use, is brought into contact with a portion of the patient's body, as by being held within the patient's armpit, for the purpose of sensing body temperature.

The electronic clinical thermometer basically includes the temperature measuring unit 102 having a temperature sensing element such as a thermister, a circuit unit 104 incorporating a large-scale integrated circuit (LSI), a DC power supply 106 such as a lithium battery, and a power supply switch 108 comprising a reed switch actuated by a magnet. These components are accommodated in an envelope or enclosure 112 made of plastic such as polypropylene or ABS and having a window 110 which is transparent so that the displayed temperature may be read. The envelope 112 comprises a slender portion 114, constituting the forward half of the thermometer, having a circular cross-section for easy insertion at the portion of the patient's body where the temperature is to be read, and a trunk portion 116 having a comparatively flat cross-section so that the thermometer may be grasped easily and so that the display window 110 may be viewed with facility. The distal end of the trunk portion 116 has a cap 118 attached liquid-tightly thereto to permit replacement of the battery.

The protective case 200 has a pair of permanent magnets 202, 204 affixed to the inner surface thereof at positions corresponding to the reed switch 108 when the electronic clinical thermometer 100 is accommodated within the case 200 at a prescribed location. The reed switch 108 is a glass-encapsulated switch having a so-called normally-closed contact (not shown), namely a contact which is closed in the absence of an applied magnetic field, and is connected between the DC power supply 106 and the circuit unit 104. The contact of the reed switch opens in response to the magnetic field from the magnets 202, 204 when the electronic clinical thermometer 100 is placed within the protective case 200 at the prescribed location, thereby interrupting the supply of power from the DC power supply 106 to the circuit unit 104. For hospital application where the electronic clinical thermometer can be expected to find use with great frequency, the combination consisting of the reed switch 108 and permanent magnets 202, 204 can be replaced by a so-called touch sensor arrangement wherein only the measuring unit 102 is in the constantly operating state, with the circuit unit, comprising a microcomputer, being adapted to keep the system in a stand-by mode to reduce power consumption. With this arrangement, arithmetic and display functions performed by the circuit unit 104 start when the measuring unit 102 senses a rise in temperature by being brought into contact with the prescribed portion of the the patient's body.

Figure 2:
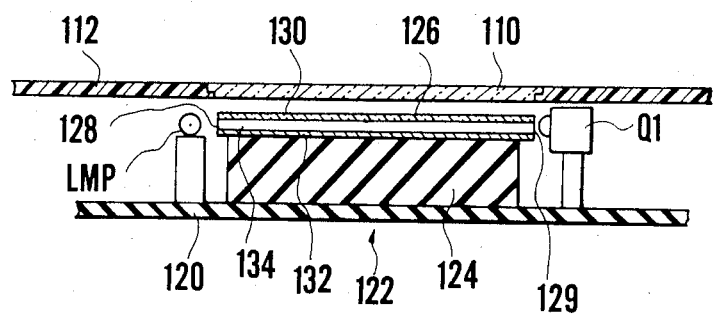
FIG. 2 is an enlarged side view illustrating display means of the electronic clinical thermometer shown in FIG. 1.

The circuit unit 104 basically includes an arithmetic circuit (not shown) comprising a large-scale integrated circuit connected to a heat sensing element (not shown) disposed in the measuring unit 102 and mounted on a printed circuit board 120, shown in FIG. 2, and display means 122 mounted on the same printed circuit board 120. As illustrated in FIG. 2, the display means 122 comprises a display element 126, such as a liquid crystal display element, affixed on the printed circuit board 102 inwardly of the transparent display window 110 by a buffer material 124 such as electrically conductive rubber, a light-emitting element LMP, such as a microlamp or light-emitting diode, affixed to the circuit board 120 near one edge of the display element 126, and a light-receiving element such as a photo-transistor affixed to the circuit board 120 near the edge of the display element 126 opposite the light-emitting element LMP.

Figure 3:
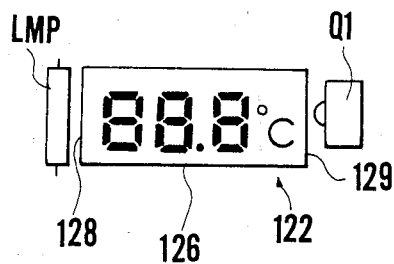
FIG. 3 is a plan view of the display means shown in FIG. 2.

The display element 126, shown in greater detail in FIG. 3, may be a digital display on which the measured temperature is displayed by display segments forming numerals, or an analog-type display on which temperature is displayed in analog fashion by a group of plural bar segments, allowing the measured temperature to be read in either centigrade or Fahrenheit. As shown in FIG. 6, the display element 126 may include a glass body formed by sandwiching a liquid crystal material 154 and electrodes (not shown) between a pair of glass plates 150, 152, a polarizing plate 130 affixed to the top side of the glass body, and a polarizing plate 156, scattering plate 158 and reflector plate 132 bonded to the bottom side of the glass plate, in the stated order. The light-emitting element LMP is so arranged that the emitted light may penetrate the interior 134 of the glass plates from one end 128 of the display element 126 to illuminate the display element in an efficient manner. The light-receiving element Q1, on the other hand, is disposed at the other end 129 of the display element 126 in such fashion as to efficiently receive light which has entered the interior 134 of the cell.

The light-emitting element LMP is driven by a lamp drive circuit shown in FIG. 4. The lamp drive circuit, a portion of which is formed using LSI techniques, is constructed on the same chip as the aforementioned arithmetic circuit. As shown in FIG. 4, a photo-transistor Q1 serving as the the light-emitting element has its collector connected to ground and its emitter connected to the output side of an inverter I1 through a load resistor R1 and to the set input S of a set-reset (SR) flip-flop FF through an inverter I2. The reset input R of the flip-flop FF is conected to the output side of an inverter I3, the input side of which is connected to the input of inverter I1. The inputs of inverters I1, I3 are connected by a common lead to a terminal LAMP to which a lamp signal LAMP is applied. The signal LAMP goes high (logical "1") for several seconds when the end of a temperature measurement is discriminated within the arithmetic circuit of the thermometer, as will be described later.

The output terminal Q of the flip-flop FF is connected to the base of a transistor Q2, for driving the light-emitting element, through a buffer amplifier A and a resistor R2. The emitter of transistor Q2 is connected to the DC power supply 106 (FIG. 1) having, say, a negative rated voltage of $-V_B$, and the collector thereof is connected to one terminal of the light-emitting element LMP. The collector of transistor Q2 is connected also to its own base through a capacitor C, whereby an integrating circuit is formed with the resistor R2. The other terminal of the light-emitting element LMP is connected to ground.

In operation, the electronic clinical thermometer 100 is taken out of the protective case 200 when the thermometer is to be used. This removes the reed switch 108 from the magnetic field produced by the permanent magnets 202, 204, whereby the contact of the reed switch is closed to supply the circuit unit 104 with power from the DC power supply 106. At this time the signal LAMP in FIG. 4 is at logical "0", whereby the inverter I3 produces a logic "1" signal which resets the flip-flop FF. Next, when the temperature measuring unit 102 at the tip of the electronic clinical thermometer is received by the patient, as by being placed in the patient's armpit, the arithmetic circuit within the circuit unit 104 effects a correction via corrective data for the temperature sensing element and for an oscillator unit 160, shown in FIG. 7, with respect to temperature stored in a non-volatile memory element 164. The correction is effected based on an A/D converter output which is a function of the temperature-induced change in the resistance of the heat sensing element. For example, the oscillation frequency of a pulse train produced by the oscillator unit 160 in FIG. 7, which incorporates the heat sensing element, is counted by the counter 162, a data processing circuit 166 performing the abovementioned correction based on the counted value. The corrected measured value is then converted into centigrade or Fahrenheit, written into a memory RAM and delivered to the display means 122.

The arithmetic circuit decides that a temperature measurement has ended by monitoring the lapse of a predetermined time period from the start of measurement, by sensing the end of prediction computations based on a judgment concerning the temperature rise curve, or by sensing a drop in temperature which ensues when the measuring unit 102 is removed from the patient's body. When the decision that temperature measurement has ended is made, the arithmetic circuit informs the operator of the event as by issuing an audible tone which lasts for a fixed time period of, say, one or two seconds, after which the signal LAMP is sent to logical "1" for several, say four to eight, seconds. The high level of the signal LAMP activates the display element 126 to provide a visible display of the measured temperature. It is also permissible to adopt an arrangement wherein the high level signal simultaneously activates a piezoelectric element to produce an audible tone for calling the operator's attention. With the change in the state of the signal LAMP to the "1" logic level, the output of inverter I1 goes to logical "0", which is equivalent to the negative voltage of $-V_B$. The photo-transistor Q1 therefore is negatively biased through the load resistor R1. The flip-flop FF, it should be noted, is not necessarily placed in the set state, for reasons as will be described later.

A signal indicative of the end of temperature measurement, which signal serves as the signal LAMP, can be generated by the data processing circuit 166 of the arithmetic unit shown in FIG. 7. A flowchart for describing the process through which the signal is produced is shown in FIG. 8.

Figure 8:
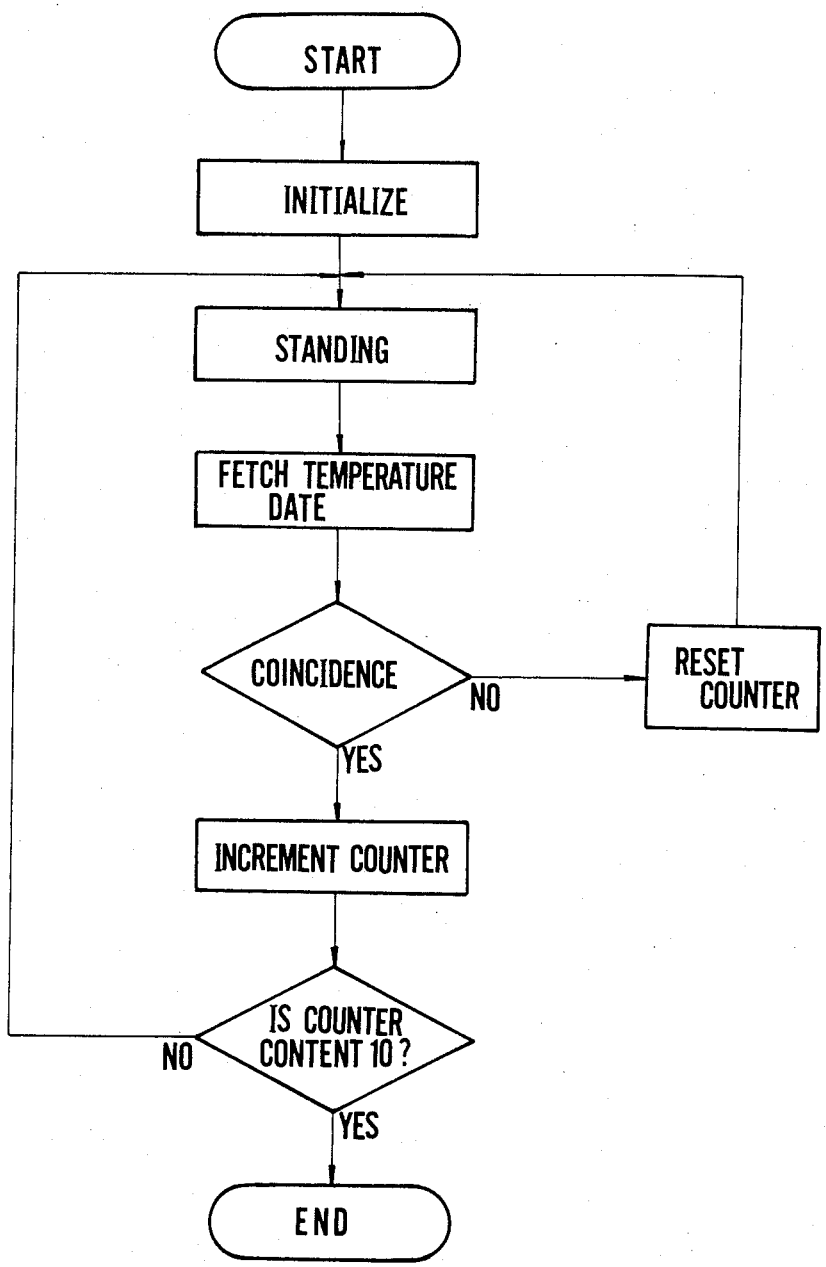
FIG. 8 is a flow chart for describing the process through which the signal, indicating the end of temperature measurement, is generated.

Referring to FIGS. 7 and 8, the data processing circuit 166, placed under the control of a central processing unit CPU, reads in temperature data from the non-volatile storage element 164 and writes the temperature data into a random-access memory RAM within the data processing circuit. Next, comparative temperature data obtained after a predetermined time delay is similarly written into the RAM by the CPU, and the first written item of data and the comparative data are compared by the CPU or by using an arithmetic program stored in a read-only memory ROM. When the two items of compared temperature data are not equivalent, the counter 162 (for which an area in the RAM or a register may be used) is reset, operation returns to the former steps, and new comparative data is found with the old comparative data serving as reference data. These steps are repeated until coincidence is established between the items of temperature data being compared. When such coincidence is achieved, the counter 162 is incremented by one step. The next step in the process is to check whether the value counted by the counter has reached ten. When this is not the case, processing returns to the point at which the temperture data is fetched. This is repeated until coincidence is confirmed ten consecutive times, by way of example. When such is the case, this indicates no further temperature rise and is interpreted as signifying the end of measurement, whereupon the CPU causes a measurement end signal LAMP to be produced as an output signal.

As another example, the measurement end signal may be obtained when a difference in mean temperature estimated from the lastest three measurements falls within the predetermined range.

Another well-known arrangement for discriminating the end of measurement is as disclosed in U.S. Pat. No. 3,942,123 entitled "Electronic Measurement System". According to this arrangement, a temperature measurement is judged to have ended when the rate of change in temperature attains a predetermined value, a signal indicating the end of measurement being produced on the basis of said judgment. Thus the same effects can be obtained as with the arrangement of FIG. 7.

Returning to FIGS. 4 and 5, when the electronic clinical thermometer 100 is exposed to the surrounding or ambient light, a portion of the ambient light, indicated at 300 in FIG. 5, passes through the transparent window 110 and impinges upon the interior of the display element 126. The incident light, indicated at 302, is repeately reflected back and forth between the reflector plate 132 and polarizing plate 130, propagates along the interior 134 of the cell and emerges from the cell edge 129 where the light then impinges upon the photo-transistor Q1. Note also that some of the ambient light, as indicated by a light ray 304, is incident directly upon the photo-transistor Q1 from the window 110. It goes without saying that the phototransistor Q1 will receive very little, if any, surrounding light 300 when the electronic clinical thermometer 100 is used in a darkened environment. The photocurrent developed by the photo-transistor Q1 will be regulated by the amount of ambient light 300, that is, in accordance with the brightness of the surroundings, and will correspondingly increase or decrease the voltage level V1 (FIG. 4) developed by the load resistor R1 connected to the emitter of the photo-transistor Q1. Since the threshold level $V_{th}$ of the inverter I2 is set to a level of $-V_B/2$ that is approximately midway between the negative power supply voltage $-V_B$ and 0 (V), the inverter I2 will produce a "1" output, setting the flip-flop FF, when the emitter potential V1 drops below the threshold value $V_{th}$, that is, when the thermometer is in a dark environment and the signal LAMP is high. In a suitably bright environment, on the other hand, the emitter potential V1 will exceed the threshold value $V_{th}$, so that the inverter I2 will produce a "0" output, even if the signal LAMP is high. The flip-flop FF will therefore remain in the reset state.

When the flip-flop FF is set by the "1" output of inverter I2, its Q output, namely logical "1", activates the transistor Q2 through the buffer amplifier A, whereby the transistor Q2 is rendered conductive to supply current to the light-emitting element LMP. The latter is activated as a result, illuminating the display element 126. The light emitted by the element LMP enters the interior 134 of the display element 126 and is scattered by the light scattering plate 158, thereby illuminating, e.g., the characters on the display plate so that the characters can be read clearly when viewed from the direction B (FIG. 5), despite the dark environment. A portion of the illuminating light travels along the interior 134 of the cell and impinges upon the photo-transistor Q1 disposed at the edge 129 opposite the light-emitting element LMP. This causes the photocurrent of the photo-transistor Q1 to increase, thereby sending the output of inverter I2 to logical "0". Flip-flop FF does not respond to the "0" logic at its set terminal S, however, and remains in the set state, the reason being that the output of inverter I3 is still low because of the high level of the signal LAMP.

Meanwhile, as mentioned hereinabove, an integrating circuit is formed by the capacitor C connected between the collector and base of the light-emitting element driving transistor Q2 and the resistor R2 connected in series with the transistor base. The integrating circuit prevents a rush current from flowing into the light-emitting element LMP during conduction of the transistor Q2. If the integrating circuit were excluded from the arrangement and, say, a tungsten microlamp were employed as the light-emitting element LMP, a large and abrupt current would flow at the initial stage of conduction because of the low temperature and, hence, low resistance, of the tungsten filament. This would cause the output voltage of the DC power supply 106 to drop owing to the internal resistance thereof, possibly resulting in the destabilization of the overall operation of the circuit unit 104. By providing the integrating circuit, however, the capacitor C is charged gradually at the time constant determined by the capacitor C and resistor R2, in accordance with the sharp rise in the Q output of the flip-flop FF when the flip-flop is set. The transistor Q2 is thus allowed to conduct only gradually, so that the collector current increases in a smooth and gentle manner to prevent a rush current from flowing when the light-emitting element LMP is activated.

The signal LAMP, the level whereof is high owing to the end of the temperature measurement, reverts to logical "0" after the passage of a predetermined length of time, such as four to eight seconds, as described above. In consequence, the display element 126 is deactivated, the visual display of the measured temperature vanishes, and the output of inverter I3 goes to logical "1", thereby resetting the flip-flop FF. The Q output of the flip-flop therefore reverts to logical "0" to deactivate the base of transistor Q2, the latter cutting off the supply of current to the light-emitting element LMP as a result. This extinguishes the light-emitting element LMP, thereby terminating the illumination of the display element 126.

The advantageous effects of the electronic clinical thermometer of the present invention are many. First, no mechanical switch of any kind is used to light the illuminating means LMP, so that there can be no malfunction caused by poor contact of mechanical contact elements. This not only enhances reliability but also does away with manually operated push-buttons or the like protruding from the thermometer envelope. This completely eliminates wasteful consumption of power owing to accidental activation of the lamp as would occur by inadvertently pressing a push-button during use of the thermometer. Second, the thermometer can be sealed tightly because a mechanically movable member for external operation need not be provided to light the lamp. Furthermore, if a magnet reed switch or touch sensor is adopted as the power supply switch, all manually operable switches can be dispensed with to make accidental operation even more unlikely. In addition, all of the circuit elements are sealed within the thermometer envelope in a liquid-tight state so that the thermometer can withstand total immersion in disinfectants and cleansing agents. Further advantages are that the temperature is displayed for a limited time only following temperature measurement, and that the display is illuminated automatically in a dark environment, when such illumination is necessary, only when a measured temperature is actually displayed. The average power consumption is therefore much less than with a display effected by means of a light-emitting diode.

As many apparently widely different embodiments of the present invention can be made without departing from the spirit and scope thereof, it is to be understood that the invention is not limited to the specific embodiments thereof except as defined in the appended claims.

What we claim is:

1. An electronic clinical thermometer of the type having temperature measuring means for measuring the temperature of the human body and for producing an output signal indicative of the measured value, display means for presenting a visual display of the measured value, and an envelope for accommodating the temperature measuring means and the display means, said electronic clinical thermometer comprising:

said display means including liquid crystal display elements which are visually recognizable only when a certain level of light is incident on said display elements;

said liquid crystal elements of said display means being sandwiched between glass-like bodies so as to propagate a fraction of the ambient light incident on the liquid crystal display elements with repeated reflection through the interior of said display means to emerge at an edge thereof;

photosensing means disposed along an edge of the liquid crystal display element where the propagated light emerges for sensing ambient light propagated between said glass-like bodies;

illuminating means provided along another edge of the liquid crystal display elements to illuminate the liquid crystal display elements; and a control circuit provided in said envelope and connected to said temperature measuring means, said illuminating means and said photosensing means, for placing said photosensing means in an operative state when said temperature measuring means completes a temperature measurement, and for automatically activating said illuminating means to illuminate said display means for visual recognition of the measured value on said display elements responsive to said photosensing means, in its said operative state, sensing a level of ambient light below said certain level.

2. The electronic clinical thermometer according to claim 1, in which said control circuit includes a transistor for driving said illuminating means, said transistor having an emitter-collector circuit connected in series with said illuminating means, and a time-constant circuit connected to a base of said transistor so that base current rises in accordance with a prescribed time constant to prevent current rush through said illuminating means.

3. The electronic clinical thermometer according to claim 1, in which said display means includes a liquid crystal display element, said illuminating means includes a light-emitting element disposed near an edge of said liquid crystal display element, and said photosensing means includes a light-receiving element disposed near an edge of said liquid crystal display element that is opposite said light-emitting element, said light receiving element being arranged to sense light transmitted through said liquid crystal element upon impinging thereon from the outside.

4. The electronic clinical thermometer according to claim 3, in which said envelope is sealed in a liquid-tight state.

5. The electronic clinical thermometer according to claim 1, wherein said control circuit is operative to deactivate said illuminating means a certain time after activating said illuminating means when the ambient light is below said certain level.

6. The electronic clinical thermometer according to claim 5, wherein said control circuit is arranged to be coupled to the display means and opertes to deactivate the display means said certain time after activating said illuminating means.

* * * * *